United States Patent
MacLellan et al.

(10) Patent No.: US 6,249,878 B1
(45) Date of Patent: *Jun. 19, 2001

(54) DATA STORAGE SYSTEM

(75) Inventors: Christopher S. MacLellan, Norwood; John K. Walton, Mendon, both of MA (US)

(73) Assignee: EMC Corporation, Hopkinton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,113

(22) Filed: Mar. 31, 1998

(51) Int. Cl.[7] .............................. G06F 11/10; G06F 11/18
(52) U.S. Cl. .............................. 714/6; 714/763; 714/770; 714/797; 714/805
(58) Field of Search .............................. 714/6, 763, 770, 714/773, 769, 797, 805

(56) References Cited

U.S. PATENT DOCUMENTS

| | | | |
|---|---|---|---|
| 4,965,717 | * 10/1990 | Cutts, Jr. et al. | 364/200 |
| 5,185,748 | * 2/1993 | Fujimura | 371/68.1 |
| 5,608,891 | * 3/1997 | Mizuno et al. | 395/441 |
| 5,751,939 | * 5/1998 | Stiffler | 395/182.13 |
| 5,951,693 | 9/1999 | Walton et al. | 714/6 |

* cited by examiner

Primary Examiner—Stephen M. Baker
(74) Attorney, Agent, or Firm—Daly, Crowley & Mofford, LLP

(57) ABSTRACT

A data storage system having a plurality of addressable memories for storing a global variable. Each one of a plurality of controllers is adapted to request an operation on first and second data stored in the addressable memories. Each one of the addressable memories includes: a control logic for receiving the operation request and addresses of the first and second data from one of the controllers; a random access memory; and a buffer memory coupled between the bus and a random access memory. The buffer memory has a write buffer memory adapted to store the first data in response to the control logic and a read buffer memory adapted to store the second data. The second data is read from the random access memory in response to the control logic. The buffer memory includes an operation selection section having a plurality of operation units configured to perform a different predetermined operation on the first and second data fed to a pair of input ports thereof. One input port is fed by an output of the write buffer memory and the other input port is fed by an output of the read buffer memory. The operation selection section also includes a selector, fed by outputs of the plurality of logic sections, for coupling one of the operation unit outputs to the random access memory selectively in accordance with the operation requested by the controller.

10 Claims, 6 Drawing Sheets

DATA STORAGE SYSTEM

BACKGROUND OF THE INVENTION

This invention relates generally to data storage systems, and more particularly to data storage systems wherein a variable stored in the system may be processed by a plurality of system resources.

As is known in the art, large mainframe or open system (i.e., host) computer systems require large capacity data storage systems. These host computer systems generally includes data processors which perform many operations (i.e., functions) on data introduced to the computer system through peripherals including the data storage system. The results of these operations are output to peripherals, including the storage system.

One type of data storage system is a magnetic disk storage system. Here a bank of disk drives and the host computer system are coupled together through an interface. The interface includes CPU, or "front end", controllers and "back end" disk controllers. The interface operates the controllers in such a way that they are transparent to the computer. That is, data is stored in, and retrieved from, the bank of disk drives in such a way that the host computer system merely thinks it is operating with one host computer memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the CPU controllers and disk controllers, addressable cache memories. The cache memory is a semiconductor memory and is provided to rapidly store data from the host computer system before storage in the disk drives, and, on the other hand, store data from the disk drives prior to being sent to the host computer. The cache memory being a semiconductor memory, as distinguished from a magnetic memory as in the case of the disk drives, is much faster than the disk drives in reading and writing data.

The CPU controllers, disk controllers and cache memory are interconnected through a backplane printed circuit board. More particularly, disk controllers are mounted on disk controller printed circuit boards. CPU controllers are mounted on CPU controller printed circuit boards. And, cache memories are mounted on cache memory printed circuit boards. The disk controller, CPU controller and cache memory printed circuit boards plug into the backplane printed circuit board. In order to provide data integrity in case of a failure in a controller, the backplane printed circuit board has a pair of busses. One set the disk controllers is connected to one bus and another set of the disk controllers is connected to the other bus. Likewise, one set the CPU controllers is connected to one bus and another set of the CPU controllers is connected to the other bus. The cache memories are connected to both busses. Thus, the use of two busses provides a degree of redundancy to protect against a total system failure in the event that the controllers, or disk drives connected to one bus fail.

In one system, the communication to the controllers and the cache memories is through a pair of bi-directional lines. Typically one bi-directional line is for data and the other bi-directional line is for control signals. As noted above, each of the controllers is connected to only one of the busses and, therefore, only one pair of bi-directional lines are electrically connected to the controllers; however, because each one of the cache memories is connected to both busses, each cache memory has two pairs of bi-directional lines.

During the operation of such a system, functional operations may be required to be performed by various system resources on a global variable stored in the system. If one resource has acquired the variable for one type of functional operation, it is important that the variable not be operated upon by another requesting system resource until the first resource has performed its operation on the variable. Thus, in many systems the variable is locked (i.e, made non-accessible by any of the other resources) until the variable has been operated on by the first resource. The locking of the variable, however, requires loss of full utilization of all system resources. For example, in the system described above, a controller requesting transfer of an addressed variable must poll the system to determined whether the variable is being operated upon by another one of the resources. This polling takes places during steps in the desired operation on the variable to see whether the variable is released from any locked condition. During the polling, the system busses are tied up thereby reducing the efficiency of the system.

SUMMARY OF THE INVENTION

In accordance with the invention, a system is provided wherein an addressable memory is coupled to a bus. The addressable memory includes: a control logic coupled to the bus; a random access memory; and a buffer memory coupled between the bus and the random access memory. The buffer memory has: a write buffer memory; a read buffer memory; and an operation selection section. The operation selection section includes a plurality of operation units, each one thereof being configured to perform a different, predetermined operation on data fed to a pair of input ports thereof. One of the input ports is fed by an output of the write buffer memory and the other input port is fed by an output of the read buffer memory. A selector is fed by outputs of the plurality of operation units for coupling a selected one of the operation unit outputs to the random access memory selectively in accordance with a control signal fed to the selector by the control logic.

With such an arrangement, a global variable is stored in the write buffer memory and the operation is performed on the stored global variable. Because the operation is performed locally (i.e., with the addressable memory, the busses are free (i.e., need not be blocked) during processing within the addressable memory. Thus, to put it another way, the controllers may communicate through the un-blocked busses.

In accordance with another feature of the invention, a system is provided wherein an addressable memory is coupled to a bus. The addressable memory includes: a control logic coupled to the bus; a random access memory; and a buffer memory coupled between the bus and the random access memory. The buffer memory has: a write buffer memory; a read buffer memory; and an operation selection section. The operation selection section includes a plurality of substantially identical operation sections. Each one of the operation sections is configured to perform a different, predetermined operation on data fed to a pair of input ports thereof. One of the input ports is fed by an output of the write buffer memory and the other input port is fed by an output of the read buffer memory. A selector is fed by outputs of the plurality of operation section for coupling a selected one of the operation section outputs to the random access memory selectively in accordance with a control signal fed to the selector by the control logic. The output from each of the plurality of substantially identical operation sections is fed to a majority gate. The output of the majority gate represents the output of a majority of the outputs from the plurality of substantially identical operation sections.

With such an arrangement, one, or more, of the operations performed by the operation section may be an operation the result of which requires generation of an error correction and detection code. More particularly, fed to the input port from the write buffer memory is data having an error correction and detection code appended thereto. The operation removes the appended code from the data and then performs the operation on the data. In order to provide error correction to any error generated by the operation, the plurality of substantially identical operation sections have the outputs thereof fed to the majority gate. The correction of any error in a minority of the operation sections is passed by the majority gate to an error correction and detection unit to append an error and detection code to the data produced by the majority gate.

In accordance with another feature of the invention, each one of the operation units in the plurality of substantially identical operation sections appends to the operation result an error and detection code.

In accordance with another feature of the invention, a data storage system is provided having a host computer section with host computer processors for processing data is coupled to a bank of disk drives through an interface. The interface includes a bus; a plurality of addressable memories coupled to the bus; and, a plurality of controllers coupled to the bus, each one thereof being adapted to request an operation on first and second data stored in the addressable memories. Each one of the addressable memories includes: a control logic for receiving the operation request and addresses of one of the first and second data requested by one of the controllers; a random access memory; and a buffer memory coupled between the bus and a random access memory. The buffer memory has a write buffer memory adapted to store therein the first data in response to the control logic. The buffer memory also includes a read buffer memory adapted to store therein the second data. The second data is read from the random access memory in response to the control logic. The buffer memory includes an operation selection section having a plurality of operation units, each one of such units being configured to perform a predetermined different operation on one of the first and second data fed to a pair of input ports thereof. One of the input ports is fed by an output of the write buffer memory and the other input port is fed by an output of the read buffer memory. The operation selection section also includes a selector fed by outputs of the plurality of operation units, for coupling one of the operation unit outputs to the random access memory selectively in accordance with a control signal fed to the selector by the control logic. The control signal is in accordance with the operation requested by the controller.

With such an arrangement, a global variable is transferred by one of the controllers to the write buffer memory and the operation is performed on the stored global variable within the addressed one of the addressable memories. Thus, with such an arrangement, because the operation is performed locally (i.e., with the addressable memory, the busses are free) they need not be blocked during processing within the addressable memory. Thus, to put it another way, the controllers may communicate through the un-blocked busses.

In accordance with another feature of the invention, one of operation units performs the operation on the data fed thereto to produce a result. The operation unit includes a error detection code generator for producing a error detection code appended to the result. The result with the appended code is passed through the selector when such operation unit output is selected by the control logic.

In accordance with still another feature of the invention, the buffer memory includes a plurality of substantially identical ones of the operation selection sections, and the buffer memory includes a majority gate fed by outputs of the plurality of operation selection sections.

In accordance with still another feature of the invention, the majority gate produces an output coupled to the random access memory.

In accordance with yet another feature of the invention, the system includes an error detection and correction unit disposed between the output of the majority gate and the random access memory and an error detection and correction unit disposed between the write buffer memory and the plurality of operation selection sections.

In accordance with another feature of the invention, each one of the plurality of operation selection sections reports the result of the selected operation to a majority gate disposed in the control logic section.

BRIEF DESCRIPTION OF THE DRAWING

Referring now to the accompanying drawings.

DESCRIPTION OF THE PREFERRED EMBODIMENTS

Figure 1:
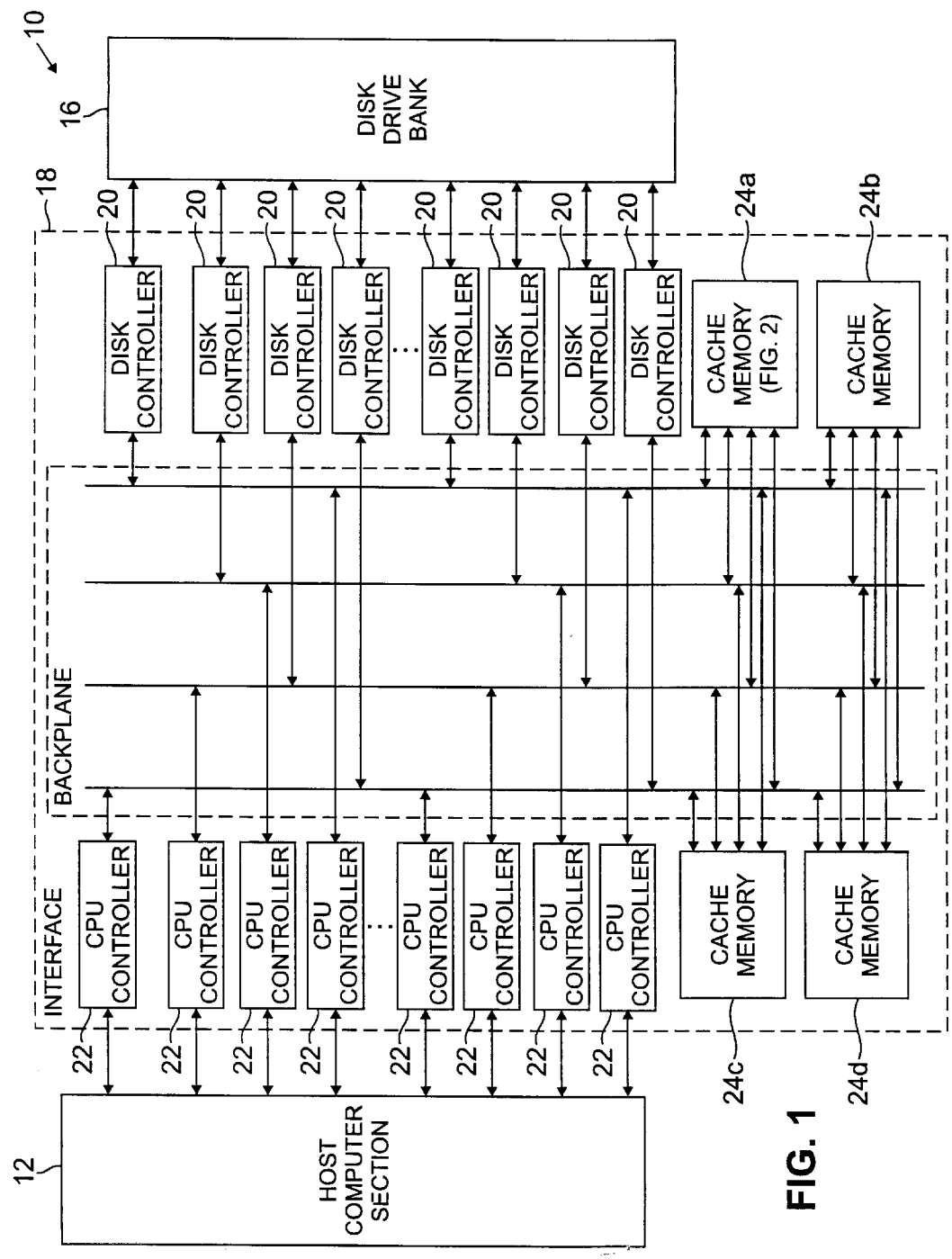
FIG. 1 is a block diagram of a computer system using a data storage system in accordance with the invention.

Referring now to FIG. 1, a computer system 10 is shown. The computer system 10 includes a host computer section 12 (e.g., a main frame or open systems computer section) having host computer processors, not shown, for processing data. Portions of the processed data are stored in, and retrieved data from, a bank 16 of disk drives through an interface 18.

The interface 18 includes disk controllers 20, central processor unit (CPU) controllers 22 and addressable cache memories 24*a*, 24*b*, 24*c*, and 24*d* electrically interconnected through a backplane 25, here four CONTROL/DATA busses; i.e., an A bus, a B bus, a C bus, and a D bus, as shown. The cache memories 24*a*, 24*b*, 24*c* and 24*d* are hereinafter sometimes referred to as memory section 24*a*, 24*b*, 24*c* and 24*d*, respectively.

More particularly, in order to provide data integrity in case of a failure in a disk controller 20 or CPU controller 22, the four of CONTROL/DATA busses (i.e., A bus, B bus, C bus and D bus) are provided. One portion of the disk controllers 20 is connected to one of the A bus, a second portion to the B bus, a third portion to the C bus and the remaining portion to the D bus. Likewise, one portion of the CPU controllers 22 is connected to the A bus, a second portion to the B bus, a third portion to the C bus and the remaining portion to the D bus. The cache memories 24a, 24b, 24c and 24d are connected to all four CONTROL/DATA busses, (i.e., the A bus, the B bus, the C bus and the D bus) as shown.

Each one of the controllers 20, 22 is adapted to assert on the CONTROL/DATA bus coupled thereto during a controller initiated control/data bus assert interval address control signal, including: (A) memory address signal; (B) memory command including a write operation request, a read operation request, and clock signals. A timing protocol suitable for use in the system 10 is described in co-pending patent application entitled "TIMING PROTOCOL FOR A DATA STORAGE SYSTEM", filed on Dec. 23, 1997, assigned to the same assignee as the present invention, the entire subject mater thereof being incorporated herein by reference.

Figure 2:
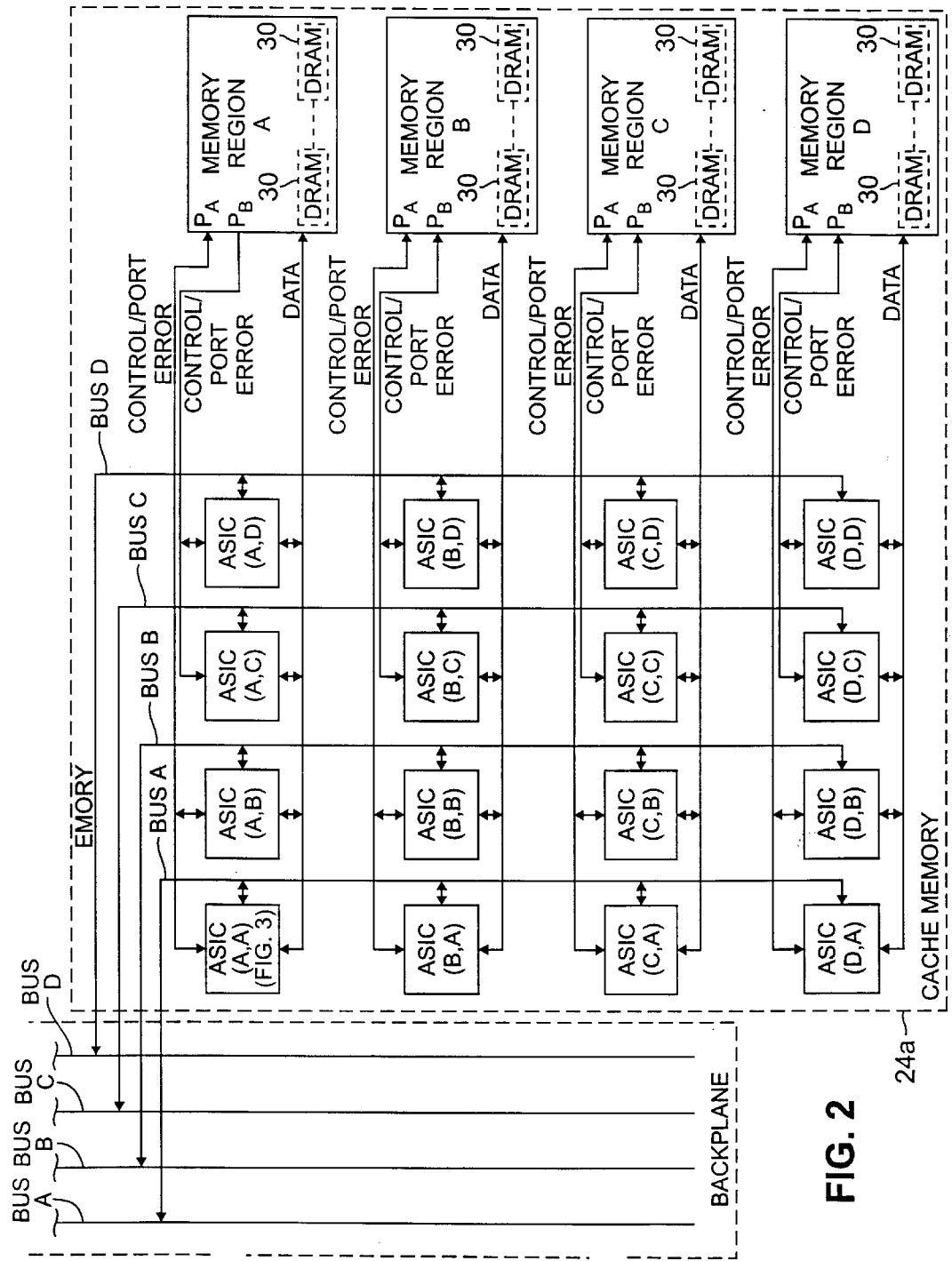
FIG. 2 is a block diagram of an exemplary one of a plurality of cache memories used in the system of FIG. 1.

An exemplary one of the cache memory sections 24a–24d, here memory section 24a is shown in detail in FIG. 2 to include a plurality of, here four random access memory (RAM) regions (i.e. RAM region A, RAM region B, RAM region C and RAM region D, as shown, and a matrix of rows and columns of control logic sections, here Application Specific Integrated circuits (ASICs), i.e, control logic section ASIC A,A . . . control logic section ASIC D,D. Each one of the four columns of control logic section ASICs is coupled to a corresponding one of the control/data busses. More particularly, a first column of control logic sections (i.e., ASICs A,A; B,A; C,A and D,A) are coupled to the A bus. A second column of control logic sections (i.e., ASICs A,B; B,B; C,B and D,B) are coupled to the B bus. A third column of control logic sections (i.e., ASICs A,C; B,C; C,C and D,C) are coupled to the C bus. A fourth column of control logic sections (i.e., ASICs A,D; B,D; C,D and D,D) are coupled to the D bus.

Each one of the rows of the control logic sections ASIC A,A . . . ASIC D,D is coupled to a corresponding one of the four RAM regions, RAM region A . . . RAM region D, via a DATA BUS, as indicated. Each one of memory regions A–D includes a plurality of dynamic random access memories (DRAMs) 30. It is noted that the data on the DATA BUS includes a plurality of, here N sets of bits. Here, each set of bits includes four bits, i.e., a nibble. The first row of ASICs A,A; A,B; A,C; and A,D is coupled to the DATA BUS of RAM region A. The second row of ASICs B,A; B,B; B,C; and B,D is coupled to the DATA BUS of RAM region B. The third row of ASICs C,A; C,B; C,C; and C,D is coupled to the DATA BUS of RAM region C. The fourth row of ASICs D,A; D,B; D,C; and D,D is coupled to the DATA BUS of RAM region D.

It is noted that each one the memory regions, i.e. memory region A, memory region B, memory region C and memory region D has a pair of redundant ports for control and port error signal; i.e., a port $P_A$ and a port $P_B$, as indicated. One of the ports $P_A$, $P_B$ is coupled to one portion of the ASICs in a corresponding one of the rows thereof and the other one of the ports $P_A$, $P_B$ is coupled to the other portion of the ASICs in the corresponding one of the rows thereof. Thus, port $P_A$ of memory region A is coupled to ASICs A,A and A,B and port $P_B$ of memory region A is coupled to ASICs A,C and A,D via a pair of CONTROL/PORT ERROR BUSSES, as indicated. Likewise, port $P_A$ of memory region B is coupled to ASICs B,A and B,B and port $P_B$ of memory region B is coupled to ASICS B,C and B,D via a pair of CONTROL/PORT ERROR BUSSES, as indicated. In like manner, port $P_A$ of memory region C is coupled to ASICs C,A and C,B and port $P_B$ of memory region C is coupled to ASICs C,C and C,D via a pair of CONTROL/PORT ERROR BUSSES, and port $P_A$ of memory region D is coupled to ASICs D,A and D,B and port $P_B$ of memory region D is coupled to ASICs D,C and D,D via a pair of CONTROL/PORT ERROR BUSSES, as indicated. The connections to the pair of redundant ports are described in co-pending patent application entitled "Memory System", inventor, John Walton, assigned to the same assignee as the present invention and filed on the same date as this application, the entire subject matter thereof being incorporated herein by reference.

It should be noted that the control logic sections ASIC A,A . . . ASIC D,D in each of the four rows thereof are interconnected through an arbitration bus, not shown, in a manner described in detail in co-pending patent application entitled "Bus Arbitration System", filed Dec. 23, 1997, inventors Christopher S. MacLellan and John K. Walton, assigned to the same assignee as the present invention, the entire subject matter thereof being incorporated in this patent application.

Figure 3:
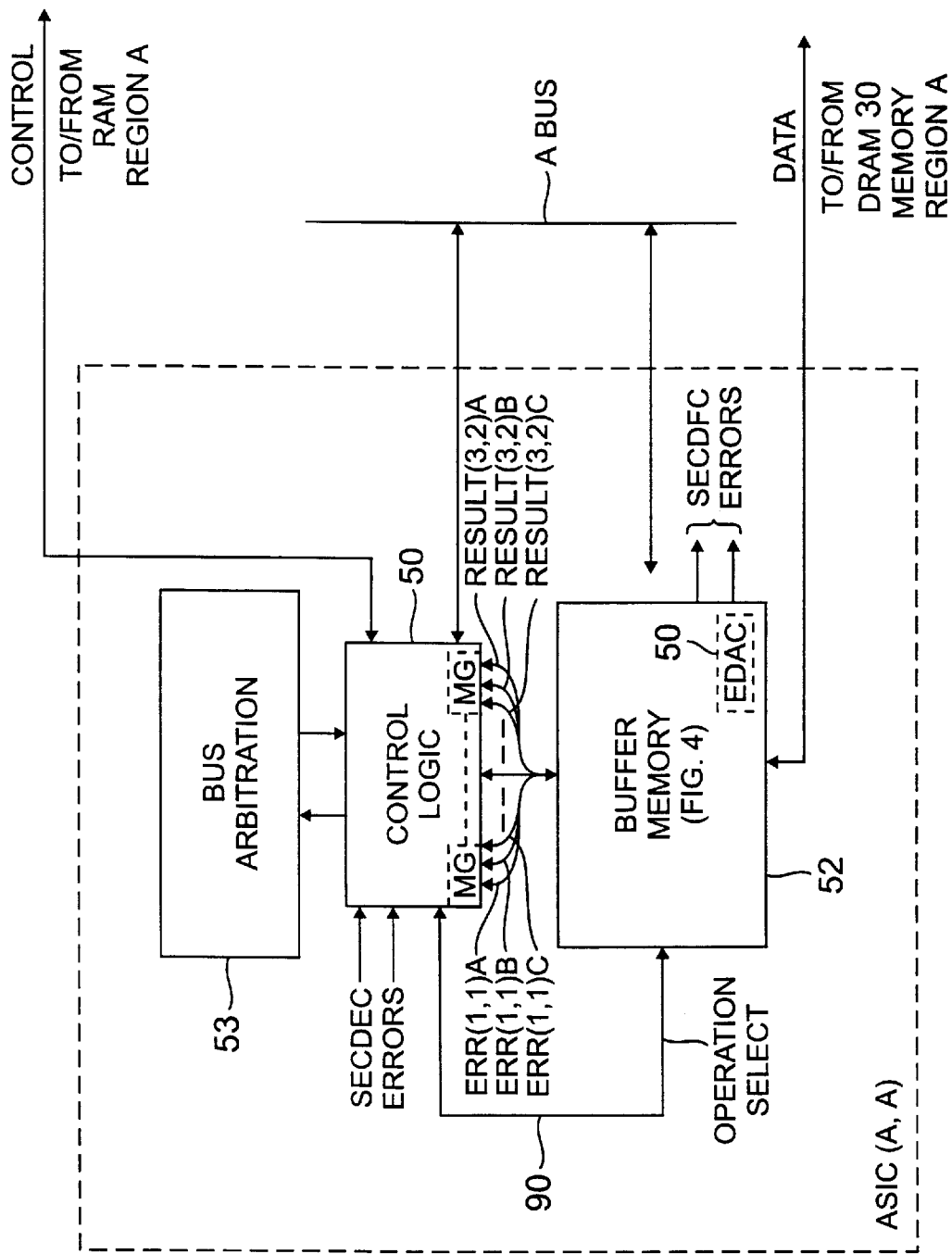
FIG. 3 is a block diagram of an exemplary one of a plurality of ASIC control logics used in the cache memories of FIG. 2.

Each one of such control logic sections ASICs A,A–D,D is identical in construction, an exemplary one thereof, here control logic section ASIC A,A being shown in detail in FIG. 3 to include a control logic 50 and a buffer memory 52 to be described in connection with FIG. 4 and described, in part, in the above-referenced co-pending patent application entitled "TIMING PROTOCOL FOR A DATA STORAGE SYSTEM". Suffice it to say here, however, that the buffer memory 52 includes a Single Nibble Correction/Double Nibble Detection (SNCDND) EDAC 50. The SNCDND EDACs are described in a paper entitled "Single Byte Error Correcting-Double Byte Error Detecting Codes for Memory Systems" by Shigeo Kaneda and Eiji Fujiwara, published in IEEE Transactions on Computer, Vol. C-31, No. 7, July 1982. pages 569–602, the entire subject matter thereof being incorporated herein by reference and the buffer memory 52 with EDAC 50 are also described in detail in co-pending patent application entitled "Memory Having Error Correction and Detection", filed Sep. 29, 1997, assigned to the same assignee as the present invention, the entire subject matter thereof being incorporated herein by reference. Here, SNCDND EDAC 50 receives data having 64 bits with 8 redundant bits, i.e., a 72 bit word. Thus, the error detection and correction unit is adapted to detect an error in the address control signal fed to one of the memory units and enable correction of data read from such memory unit. Further, the error detection and correction unit is adapted to detect an error in the address control signal fed to more than one of the memory units (i.e., here two memory units) and enable detection of data read from such memory unit.

The ASIC (A,A) controls transfer of data between the buffer memory 52 and the one of the plurality of control/data busses (i.e., A bus, B bus B, C bus and D bus) coupled to the control logic section ASIC A,A, here bus A. The control logic section ASIC A,A is adapted to produce a control/data bus request for the one of the control/data busses coupled thereto (here RAM region A) and is adapted to effect the transfer in response to a control/data bus grant fed to the control logic section (here ASIC A,A) in accordance with a protocol described in the above-referenced, co-pending application entitled "TIMING PROTOCOL FOR A DATA STORAGE SYSTEM". The control logic section ASIC A,A also includes a bus arbitration section 53 described in detail in connection with the above referenced patent application entitled "Bus Arbitration System", filed Dec. 23, 1997, inventors Christopher S. MacLellan and myself, John K. Walton.

Figure 4:
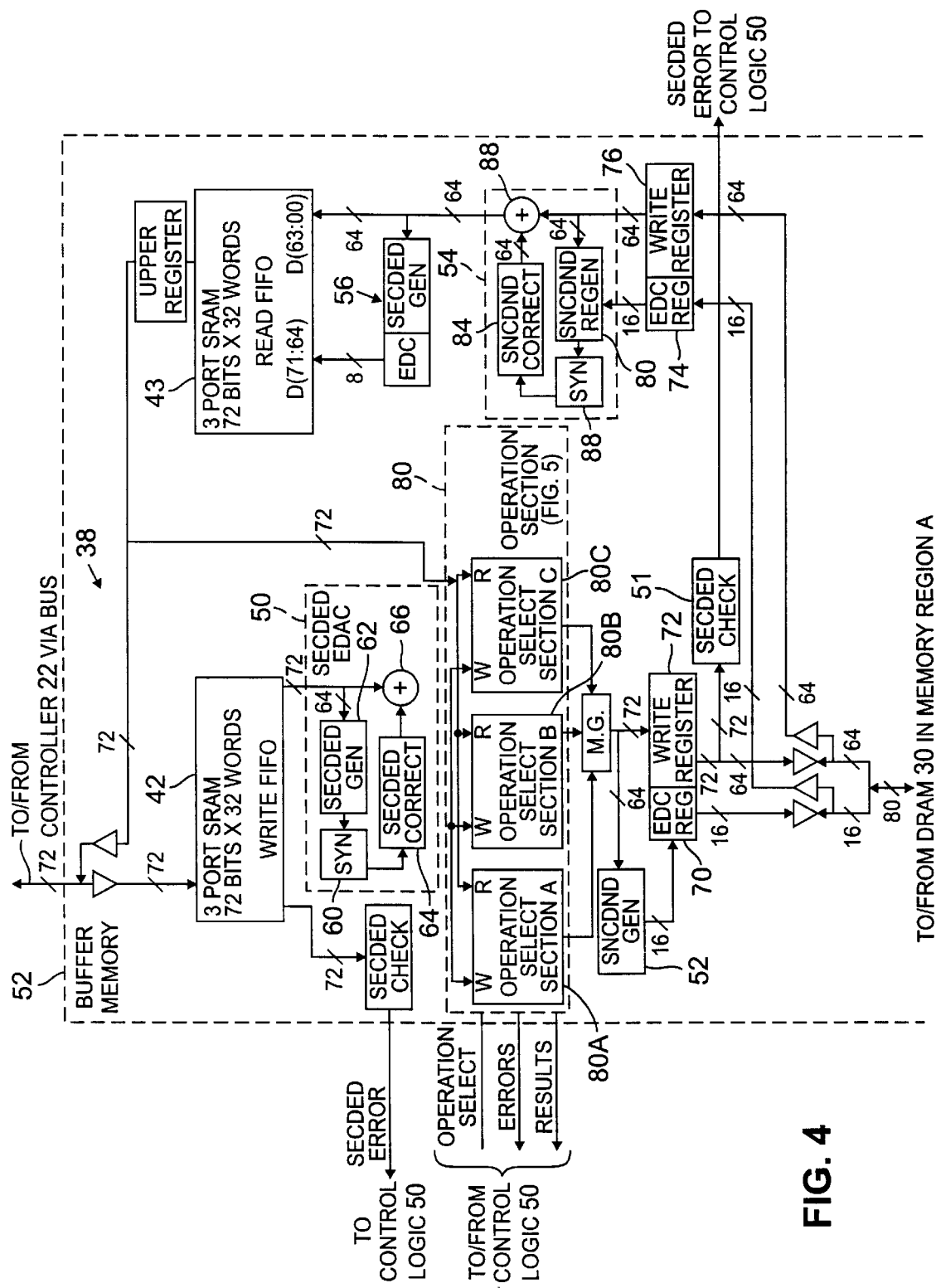
FIG. 4 is a block diagram of a buffer memory used in the cache memory of FIG. 2, such buffer memory having an operation section according to the invention.

Referring to FIG. 4, the buffer memory 52 includes a write first-in/first-out memory (FIFO) 42 and a read FIFO 43. Use of FIFOs in a system is described in co-pending patent application Ser. No. 08/701,917, filed Aug. 23, 1996, entitled "Data Storage System Having Master/Slave Addressable Memories", assigned to the same assignee as the present invention, the entire subject matter thereof being incorporated herein by reference.

It is first noted that each one of the controllers 20, 22 includes a single error correction-double error detection (SECDED) error detection and correction code (EDAC) to check for the integrity passing between such one of such controllers 20, 22, through the memory 22a, 22b and to another one of the controllers 20, 22. Here, such SECDED EDAC is a conventional double-bit Hamming code.

Thus, as noted above, the buffer memory 52 includes: the pair of FIFOs 42, 43. Also included in the buffer memory 52 are the, here two-bit Hamming, SECDED EDAC 50 coupled to the output of the write FIFO 42; an operation section 80, to be described in more detail in connection with FIG. 5; and, a Single Nibble Correction/Double Nibble Detection (SNCDND) EDAC 52 coupled to the output of the operation section 80, the output of which is fed to the DRAM 30 (FIG. 2). The buffer memory 52 also includes a second SNCDND EDAC 54 coupled to the output of the DRAM 30; and a second SECDED EDAC 56 coupled to the output of the second SNCDND EDAC 54, as shown. The second SNCDND EDAC 56 is fed to the read FIFO 43, as shown.

The SECDED and SNCDND EDACs are described in the paper entitled "Single Byte Error Correcting-Double Byte Error Detecting Codes for Memory Systems" by Shigeo Kaneda and Eiji Fujiwara, published in IEEE Transactions on Computer, Vol. C-31, No. 7, July 1982. pages 569–602, the entire subject matter thereof being incorporated herein by reference.

More particularly, the SECDED EDAC 50 receives data with redundant bits from the controller 20, 22. Here the data is 64 bits and there are 8 redundant bits, i.e., a 72 bit word. The 72 bit word is written into the write FIFO 42 as described in the above-referenced co-pending patent application filed Sep. 29, 1997. When read from the write FIFO 42, the 72 bit word is passed to the first SECDED EDAC 50 for correction of a single bit error or detection of a double bit error in the 72 bit word read from the write FIFO 42. The SECDED EDAC 50 includes a conventional syndrome 60 fed by the redundant bits, here the 8 redundant bits of the 72 bit word from the write FIFO 42 and the here N=64 bits of data in such 72 bit word is fed to a SECDED generator 62. The output of the syndrome 60 is a m=8 bit word which is fed to a SECDED corrector 64 to thereby generate an N+M=72 bit correction vector. The correction vector produced by the SECDED corrector 64 is fed to an exclusive OR 66 along with the 72 bit word produced at the output of the FIFO 42. The exclusive OR 66 corrects the 72 bit word produced at the output of the FIFO 42 with the correction vector produced by the SECDED corrector 72 in accordance with the double bit Hamming code, assuming at most a single bit error in the 64 bit data.

The output of the SECDED EDAC 50 is fed to an operation section 80, as shown. The operation section 80 is shown in more detail in FIG. 5 to include a plurality of, here three, identical operation selection sections 80A–80C (i.e., Operation Selection Section A, Operation Selection Section B, and Operation Selection Section C), an exemplary one thereof, here Operation Selection Section 80A being shown in detail in FIG. 6. Each one of the Operation Selection Sections 80A, 80B, and 80C includes a pair of input port (i.e, port W and port R). Port W is coupled to the write FIFO 42 through the SECDED EDAC 50, as indicated. The other port, i.e, PORT R, is coupled to the output of the read FIFO 43, as indicated.

Figure 6:
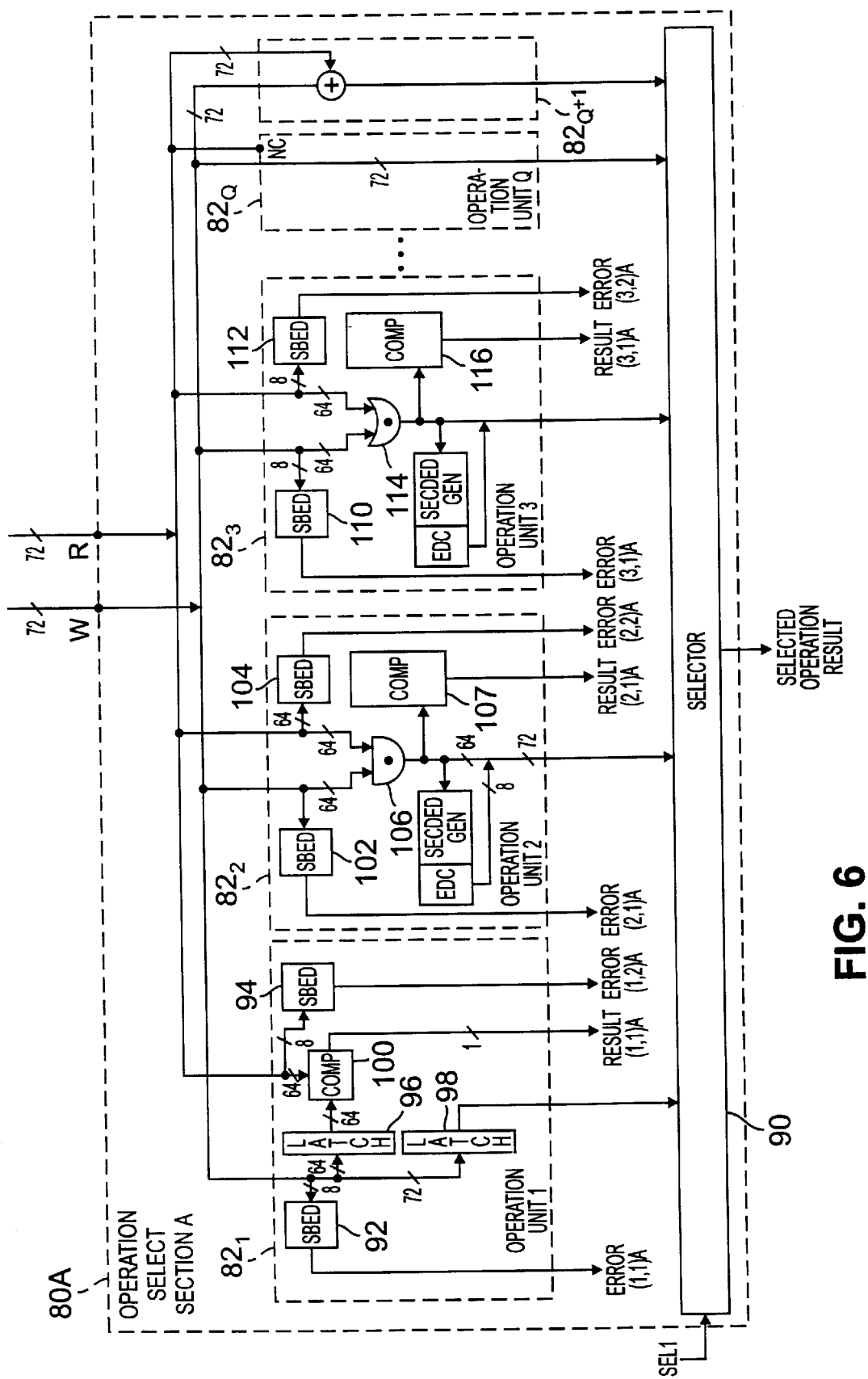
FIG. 6 is a block diagram of an exemplary one of a plurality of operation selection sections included in the operation section of FIG. 5, such operation selection section having a plurality of operation units, each one thereof being configured to provide a different operation.

As shown in FIG. 6 for an exemplary one of the Operation Selection Sections 80A–80C. here Operation Section Unit 80A, is shown to include a plurality of, here Q+1, hardware dedicated Operation Units $82_1$–$82_{Q+1}$. Each one of the Operation Units $82_1$–$82_{Q+1}$ is adapted to perform one of a corresponding one of plurality of Q+1 operations upon a global variable, GV. Thus, for example, Operation Unit $82_1$, is configured to perform a "compare and swap" operation, Operation Unit $82_2$ is configured to perform a "bit clear" operation, Operation Unit $82_3$ is configured to perform a "bit set" operation, Operation Unit $82_Q$ is configured to merely pass the data at the port W to the output of the logic, and Operation Unit $82_{Q+1}$ is configured to perform an Exclusive OR operation, as described in the above referenced patent application. It should be understood that other operations may be performed by additional specifically configured, dedicated Operation Units.

Figure 5:
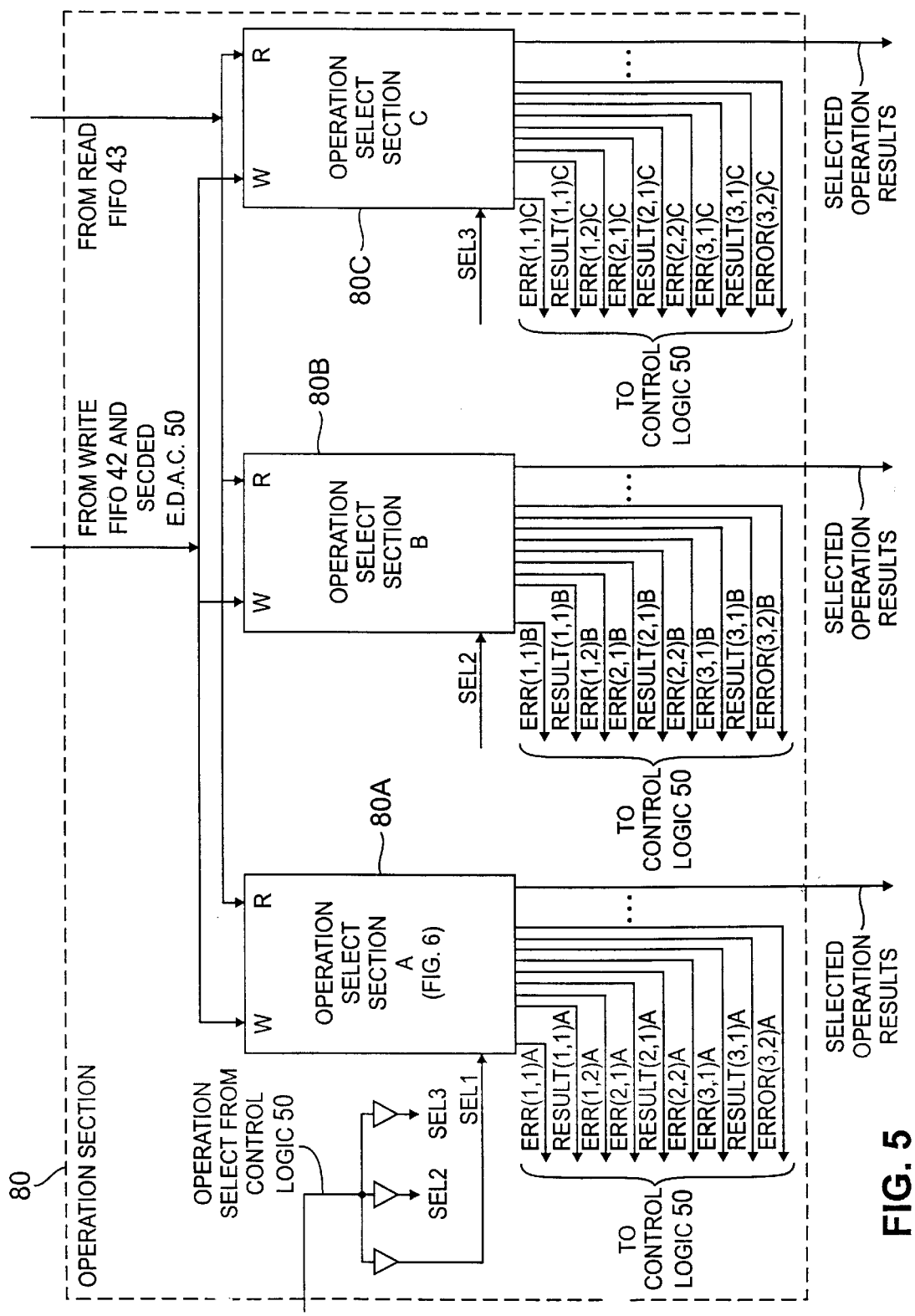
FIG. 5 is a block diagram of the operation section of FIG. 4.

Thus, a global variable, GV, stored in memory region A may be transferred, by commands from one of the controllers 20, 22, from one DRAM 30 in Memory Region A (FIG. 2), for example, to the read FIFO 42 (FIG. 4) while data D in another one of the DRAMs 30 of memory region A is transferred to the Read FIFO 43 on one of the busses A, B, C or D. The operation is converted by the control logic 50 into an operation select control signal for the Operation Unit 80. Referring to FIG. 5, it is noted that three copies of the operation select control signal are fed to the Operation Selection Sections, i.e., each of three identical copies of the operation select control signal, $SEL_1$, $SEL_2$, $SEL_3$ is fed to a corresponding one of the three Operation Selection Sections 80A, 80B and 80C, respectively.

More particularly, referring to FIG. 6, each one of the Operation Selection Sections 80A, 80B and 80C, includes a selector 90, as shown for exemplary Operation Selection Section 80A. The selector 90 is fed by outputs of each of the Operation Units $82_1$ through $82_{Q+1}$, as shown. The output of one of the Operation Units $82_1$–$82_{Q+1}$ is fed to the output of the selector 90 selectively in accordance with the operation select signal fed thereto by the control logic 50 (FIG. 3) on line $SEL_1$. In like manner two other copies of the control select are fed to lines $SEL_2$ and $SEL_3$ to the Operation Selection Sections 80B and 80C as indicated in FIG. 5.

As shown in FIG. 4, the outputs of the three Operation Selection Sections 80A, 80B and 80C are fed to a majority gate MG. The majority gate MG produces the result of the operation performed by the Operation Selection Sections 80A–80C if two of the three results are the same.

The output of the majority gate MG is fed to a SNCDND EDAC 52 which generates a P=16 bit nibble redundant code along with the 72 bits of data produced by the SECDED 50. The N=64 bit portion of the 72 bit word produced by the SECDED EDAC 50 is encoded by the SNCDND EDAC 52 to enable downstream correction of a single nibble error (i.e., 4 bit error) in the N+P=80 bit word or to enable detection of an error if two nibbles are found to be in error. Thus, the SNCDND generator 52 produces a P=16 bit redundancy code which is stored in an EDC register 70; the 72 bit word produced by the SECDED EDAC 50 being stored in a write register 72. Thus, the EDC and write registers 70, 72 together store an N+P=80 bit word for storage in the DRAM 30 (FIG. 2). Here, the DRAM 30 includes 20 DRAM packages each package storing 4 bits (i.e., a nibble) of the word fed to it.

When the 80 bit word is read from the DRAM 30 it is are fed to an EDC register 74 and read register 76 (FIG. 4). The 16 redundant bits $B_{65}$–$B_{80}$ of the word are stored in the EDC register 74 and 64 data bits, $B_1$–$B_{64}$ of such word are stored in the read register 76. The 80 bits of word stored in the EDC and read registers 74, 76 are fed to the SNCDND EDAC 54 to detect any errors in each of the 20 sets of nibbles stored in packages using the four sets of redundant nibbles stored in packages. Such single nibble correction/double nibble detection process is described in the above referenced paper. The SNCDND EDAC 54 corrects a nibble if there is only one erroneous nibble (i.e., a defect in one of the packages) or will detect the presence of an error if there are two erroneous nibbles (i.e., defects in two of the packages).

The SNCDND EDAC 54 includes a SNCDND regenerator 80 fed by the 64 bits of the word in the read register 76 and a syndrome 82 fed by the four nibbles of redundant data in the EDC register 74. A SNCDND corrector 84 produces a correction vector which is used by the exclusive OR 88 to correct any single nibble error or to detect any double nibble error in the 64 bits of data read from the DRAM 30. The corrected output produced by the exclusive OR 88 is fed to the SECDED 56 (here a double Hamming code EDAC), to produce an redundant 8 bit code for the 64 bit word produced by the SNCDND EDAC 54. The 72 bit word produced by the EDC and SECDED generator sections of the SECDED EDAC 54 are fed to the read FIFO 43, as indicated. Thus, a controller 20, 22 (FIG. 2) which is fed the 64 bit word read from read FIFO 43 is adapted to have the double bit Hamming EDAC therein correct for any errors which may be produced in passing the 64 bit word from the write FIFO 43 to such controller 20, 22.

Referring again to FIG. 6, as noted above, the Operation Selection Section 80 includes a plurality of differently configured, hardwired, dedicated, Operation Units $82_1$–$82_{Q+1}$. Considering first, Operation Unit $82_1$, here configured to perform a "compare and swap" operation, such unit $82_1$ includes a pair of single bit error detection (SBED) units 92, 94 coupled to the data on input ports W and R respectively. If a single bit error is detected by the SBED unit 92 it is reported to the control logic 50 (FIG. 3) on line ERROR $(1,1)_A$. Likewise, if a single bit error is detected by the SBED unit 94 it is reported to the control logic 50 (FIG. 3) on line ERROR $(1,2)_A$. The "compare and swap" operation requires that a first data $D_1$ be compare to the global variable GV and if the two compare, a second data $D_2$ becomes stored in the DRAM 30; on the other hand, if the first data $D_1$ is different from the global variable, GV, the second data is not stored in the DRAM 30. Thus, here one of the controller 20, 22 requests the global variable, GV, from an specified address in the addressable memories 24a–24d, here a DRAM 30 in memory region A of addressable memory 24a. The global variable is read from the DRAM 30 and is stored (i.e., written) into read FIFO 43 (FIG. 4). Also specified is the "compare and swap" operation which becomes stored in the control logic 50 (FIG. 3) of memory region A of addressable memory 24a. The controller 20, 22 then sequentially places on the bus coupled thereto (i.e., A bus, B bus, C bus., or D bus, as the case may be) the first data $D_1$ followed sequentially by the second data $D_2$. The first data $D_1$, after the eight bits of EDAC have been removed for SBED 92, (i.e., data $D_1$ is here 64 bits) becomes latched in latch 96 and the second data $D_2$ (i.e, the entire 72 bits at port W) becomes stored in latch 98. The first data $D_1$ is compared to the global variable GV (here 64 bits, the eight bit EDAC being removed for the SBED 94) fed to comparator 100 along with the latched data $D_1$. If the comparator 100 indicates that the first data $D_1$ is the same as the global variable GV, a "swap" result is produced by the comparator 100 on line RESULT $(1,1)_A$ for the control logic 50 (FIG. 3). If, on the other hand, the comparator 100 indicates that the first data $D_1$ is different from the global variable GV, a "no swap" result is produced by the comparator 100 on line RESULT $(1,1)_A$ for the control logic 50 (FIG. 3). Line RESULT $(1,1)_A$ is fed to the control logic 50 (FIG. 3) for re-transmission to the requesting controller 20, 22 via the "ending status bus" described in co-pending patent application filed Dec. 23, 1997. It is noted that Operation Selection Section 80B and 80C operate in like manner and produce the results on line RESULT $(1,1)_B$ and line RESULT $(1,1)_C$, respectively. Further, in like manner SBED error reports which were produced on ERROR $(1,1)_A$ and ERROR $(1,2)_A$ are produced by Operation Selection Sections 80B and 80C ERROR $(1,1)_B$ and ERROR $(1,2)_B$ and ERROR $(1,1)_C$, respectively.

Each of the three copies of ERROR (1,1) (i.e.,ERROR $(1,1)_A$, ERROR $(1,1)_B$, ERROR $(1,1)_C$ are fed to as a Triple Modular Redundancy (TMR) to a majority gate MG in the control logic 50 (FIG. 3), as indicated. The same TMR procedure is used for the three copies of ERROR (1,2) (i.e., ERROR $(1,2)_A$, ERROR $(1,2)_B$, ERROR $(1,2)_C$, as indicated in FIG. 5) and for RESULT (1,1) (i.e., RESULT $(1,1)_A$, RESULT $(1,1)_B$, RESULT $(1,1)_C$, as indicated in FIG. 5).

Referring now to Operation Unit $82_2$, such unit is configured to perform a "bit clear" operation. Operation Unit $82_2$ includes a pair of single bit error detection (SBED) units 102, 104 coupled to the data on input ports W and R respectively. If a single bit error is detected by the SBED unit 102 it is reported to the control logic 50 (FIG. 3) on line ERROR $(2,1)_A$ and then to the controller 20, 22 issuing the request, via the above mentioned "status line". Likewise, if a single bit error is detected by the SBED unit 104 it is reported to the control logic 50 (FIG. 3) on line ERROR $(2,2)_A$. The "bit clear" operation requires that input data $D_1$ at input port W be AND gated with the global variable GV at input port R in AND gate 106 with the result being compared in comparator 107 with the global variable GV, and if the two don't compare, the result produced by the AND gate 106 will be, with an appended EDC code, stored in DRAM 30; on the other hand, if the two do compare, the result produced by the AND gate 106 is not stored in the DRAM 30. Thus, here one of the controller 20, 22 requests the global variable, GV, from an specified address in the addressable memories 24a–24d, here a DRAM 30 in memory region A of addressable memory 24a. The global variable is read from the DRAM 30 and is stored (i.e., written) into FIFO 43 (FIG. 4). Also specified is the "bit clear" operation which becomes stored in the control logic 50 (FIG. 3) of memory region A of addressable memory 24a. The controller 20, 22 then places on the bus coupled thereto (i.e., A bus, B bus, C bus, or D bus, as the case may be) the data $D_1$. The result produced by the AND gate 106 is compared to the global variable GV in comparator 107. If the comparator 107 indicates that the result produced by the AND gate 106 are different from the global variable, GV, the "bit clear" result is produced by the comparator 107 on line RESULT $(2,1)_A$ for the control logic 50 (FIG. 3). If, on the other hand, the comparator 107 indicates that the result produced by the AND gate 106 is the same as the global variable, GV, the "no bit clear" result is produced by the comparator 107 on line RESULT $(2,1)_A$ for the control logic 50 (FIG. 3). Line RESULT $(2,1)_A$ is fed to the control logic 50 (FIG. 3) for re-transmission to the requesting controller 20, 22. It is noted that Operation Selection Section 80B and 80C operate in like manner and produce the results on line RESULT $(2,1)_B$ and line RESULT $(2,1)_C$, respectively. Further, in like manner SBED error reports which were produced on ERROR $(2,1)_A$ and ERROR $(2,2)_A$ are produced by Operation Selection Sections 80B and 80C ERROR $(2,1)_B$, and ERROR $(2,1)_B$ and ERROR $(2,1)_C$, respectively.

It is noted that fed to the input port from the write buffer memory is data having an error correction and detection code appended thereto. The operation removes the appended code from the data and then performs the operation on the data. In order to provide error correction to any error generated by the operation, the plurality of substantially identical operation sections have the outputs thereof fed to the majority gate. The correction of any error in minority of the operation sections is passed by the majority gate to an error correction and detection unit to append an error and detection code to the data produced by the majority gate.

More particularly, as noted above, the 64 bits of data to be processed by operation unit $82_2$ has appended to it an 8 bit error and detection code. The AND gate 106 (actually 64 separate AND gates) operates on the 64 bits of data fed thereto on port W and the 64 bits of data fed thereto at port R. That is, the 8 bits of error detection and correction code on ports W and R are removed and fed to SBED 102 and 104, respectively. The result produced by the AND gate 106 operation thus does not have error detection and correction protection. To put it another way, an error or fault in the AND gate 106 or in the metal wires to or from the AND gate 106 result in a fault or error in the result produced by the AND gate 106. To correct any such error or fault, Triple Modular Redundancy (TMR) is provided. More particularly, three substantially identical units $82_2$ are provided; one in each of the operation selection sections A, B and C shown in FIG. 4. The three outputs are fed to a majority gate (M.G.) shown in FIG. 4. If there is an error or fault in any one of the three sections A, B, or C it is corrected by the majority gate MG. It is also noted that an error detection an correction code is appended to the result produced by the AND gate 106 (FIG. 6). Thus, the data with appended error detection and correction code is detectable by SECDED 51 (FIG. 4).

Further, each of the three copies of ERROR (2,1) (i.e., ERROR $(2,1)_A$, ERROR $(2,1)_B$, ERROR $(2,1)_C$ are fed to as a Triple Modular Redundancy (TMR) to a majority gate MG in the control logic 50 (FIG. 3), as indicated. The same TMR procedure is used for the three copies of ERROR (2,2) (i.e., ERROR $(2,2)_A$, ERROR $(2,2)_B$, ERROR $(2,2)_C$, as indicated in FIG. 5) and for RESULT (2,1) (i.e., RESULT $(2,1)_A$, RESULT $(2,1)_B$, RESULT $(2,1)_C$, as indicated in FIG. 5.

Referring now to Operation Unit $82_3$, such unit is configured to perform a "bit set" operation. Operation Unit $82_3$ includes a pair of single bit error detection (SBED) units 110, 112 coupled to the data on input ports W and R respectively. If a single bit error is detected by the SBED unit 110 it is reported to the control logic 50 (FIG. 3) on line ERROR $(3,1)_A$. Likewise, if a single bit error is detected by the SBED unit 112 it is reported to the control logic 50 (FIG. 3) on line ERROR $(3,2)_A$. The "bit set" operation requires that input data $D_1$, at input port W be AND gated with the global variable GV at input port R in OR gate 114 with the result being compared in comparator 116 with the global variable GV, and if the two do not compare, the result produced by the OR gate 114 be, with an appended EDC code, stored in DRAM 30; on the other hand, if the two do compare, the result produced by the OR gate 114 is not stored in the DRAM 30. Thus, here one of the controller 20, 22 requests the global variable, GV, from an specified address in the addressable memories 24a–24d, here a DRAM 30 in memory region A of addressable memory 24a. The global variable is read from the DRAM 30 and is stored (i.e., written) into FIFO 43 (FIG. 4). Also specified is the "bit set" operation which becomes stored in the control logic 50 (FIG. 3) of memory region A of addressable memory 24a. The controller 20, 22 then places on the bus coupled thereto (i.e., A bus, B bus, C bus., or D bus, as the case may be) the data $D_1$. The result produced by the OR gate 114 is compared to the global variable GV in comparator 116. If the comparator 116 indicates that the results produced by the OR gate 114 are different from the global variable GV, the "bit set" result is produced by the comparator 116 on line RESULT $(3,1)_A$ for the control logic 50 (FIG. 3). If, on the other hand, the comparator 116 indicates that the result produced by the OR gate 116 is the same as the global variable GV, the "no bit set" result is produced by the comparator 107 on line RESULT $(3,1)_A$ for the control logic 50 (FIG. 3). Line RESULT $(3,1)_A$ is fed to the control logic 50 (FIG. 3) for subsequent re-transmission to the requesting controller 20, 22. It is noted that Operation Selection Section 80B and 80C operate in like manner and produce the results on line RESULT $(3,1)_B$ and line RESULT $(3,1)_C$, respectively. Further, in like manner SBED error reports which were produced on ERROR $(3,1)_A$ and ERROR $(3,2)_A$ are produced by Operation Selection Sections 80B and 80C ERROR $(3,1)_B$ and ERROR $(3,1)_B$ and ERROR $(3,1)_C$, respectively.

It is noted that, here again, as with unit $82_2$, the 64 bits of data to be processed by operation unit $82_3$ has appended to it an 8 bit error and detection code. The OR gate 114 (actually 64 separate OR gates) operates on the 64 bits of data fed thereto on port W and the 64 bits of data fed thereto at port W. That is, the 8 bits of error detection and correction code on ports W and R are removed and fed to SBED 110 and 112, respectively. The result produced by the OR gate 114 operation thus does not have error detection and correction protection. To put it another way, an error or fault in the OR 114 or in the metal wires to or from the OR gate 114 result in a fault or error in the result produced by the OR gate 114. To correct any such error or fault, Triple Modular Redundancy (TMR) is provided. More particularly, three substantially identical units $82_3$ are provided; one in each of the operation selection sections A, B and C shown in FIG. 4. The three outputs are fed to a majority gate M.G. shown in FIG. 4. If there is an error or fault in any one of the three sections A, B, or C, such error is corrected by the majority gate MG. It is also noted that an error detection an correction code is appended to the result produced by the OR gate 114 (FIG. 6). Thus, the data with appended error detection and correction code is detectable by SECDED 51 (FIG. 4).

Each of the three copies of ERROR (3,1) (i.e., ERROR $(3,1)_A$, ERROR $(3,1)_B$, ERROR $(3,1)_C$ are fed to as a Triple Modular Redundancy (TMR) to a majority gate MG in the control logic 50 (FIG. 3), as indicated. The same TMR procedure is used for the three copies of ERROR (3,2) (i.e., ERROR $(3,2)_A$, ERROR $(3,2)_B$, ERROR $(3,2)_C$, as indicated in FIG. 5) and for RESULT (3,1) (i.e., RESULT $(3,1)_A$, RESULT $(3,1)_B$, RESULT $(3,1)_C$, as indicated in FIG. 5.

Referring now to Operation Unit $82_Q$, such unit is configured to perform a "no functional operation" operation. Operation Unit $82_3$ merely passes the data on input port R to the input of selector 90 and if the "no functional operation is selected by $SEL_1$, the data at the input port R is passed to the output of the selector 90 and is thus available for storage in the DRAM 30 as controlled by the control logic 50 (FIG. 3).

Referring now to Operation Unit $82_{Q+1}$, such unit is configured to perform a "Exclusive OR function" operation, as described in a co-pending patent application Ser. No. 08/941,506, entitled "Data Storage System Having Data Reconstruction" filed Sep. 30, 1997, inventors John K. Walton and Eli Leshem, the entire contents thereof being incorporated herein by reference.

Other embodiments are within the spirit and scope of the appended claims.

What is claimed is:

1. A system, comprising:
   (A) a bus;
   (B) an addressable memory coupled to the bus, such memory comprising:
      (a) a control logic; and
      (b) a random access memory;
      (c) a buffer memory coupled between the bus and a random access memory, such buffer memory having:
         (1) a write buffer memory;
         (2) a read buffer memory;
         (3) an operation selection section having:
            (i) a plurality of operation units, each one thereof being configured to perform a predetermined operation on data fed to a pair of input ports thereof, one of such input ports being fed by an output of the write buffer memory and the other input port being fed by an output of the read buffer memory; and,
            (ii) a selector fed by outputs of the plurality of operation units, for coupling a selected one of the operation unit outputs to the random access memory selectively in accordance with a control signal fed to the selector by the control logic.

2. The system recited in claim 1 wherein one of operation units performs the operation on the data fed thereto to produce a result, and wherein the logic section includes a error detection code generator for producing a error detection code appended to the result.

3. A data storage system wherein a host computer section having host computer processors for processing data is coupled to a bank of disk drives through an interface, such interface comprising:
   (A) a bus;
   (B) a plurality of addressable memories coupled to the bus;
   (C) a plurality of controllers coupled to the bus, each one thereof being adapted to request an operation on first and second data stored in the addressable memories; and
   wherein each one of the addressable memories includes:
      (a) a control logic for receiving the operation request and addresses of the first and second data from one of the controllers;
      (b) a random access memory; and
      (c) a buffer memory coupled between the bus and a random access memory, such buffer memory having:
         (1) a write buffer memory adapted to store therein the first data in response to the control logic;
         (2) a read buffer memory adapted to store therein the second data, such second data being read from the random access memory in response to the control logic;
         (2) a operation unit section having:
            a plurality of operation units, each one thereof being configured to perform a different, predetermined operation on the first and second data fed to a pair of input ports thereof, one of such input ports being fed by an output of the write buffer memory and the other input port being fed by an output of the read buffer memory; and,
            (ii) a selector fed by outputs of the plurality of operation units, for coupling one of the operation unit outputs to the random access memory selectively in accordance with a control signal fed to the selector by the control logic, such control signal being in accordance with the operation requested by the controller.

4. The system recited in claim 3 wherein one of operation units performs the operation on the data fed thereto to produce a result, and wherein the logic includes a error detection code generator for producing a error detection code appended to the result.

5. The system recited in claim 3 wherein the buffer memory includes a plurality of substantially identical operation selection sections, and wherein the buffer memory includes a majority gate fed by outputs of the plurality of operation selection sections.

6. The system recited in claim 5 wherein the majority gate produces an output coupled to the random access memory.

7. The system recited in claim 6 includes an error detection and correction unit disposed between the output of the majority gate and the random access memory.

8. The system recited in claim 6 includes an error detection and correction unit disposed between the write buffer memory and the plurality of operation selection sections.

9. The system recited in claim 7 includes an error detection and correction unit disposed between the write buffer memory and the plurality of operation selection sections.

10. The system recited in claim 9 wherein each one of the plurality of operation selection sections reports the result of the selected operation to a majority gate disposed in the control logic.

* * * * *